(12) United States Patent
Sykes et al.

(10) Patent No.: US 9,209,718 B2
(45) Date of Patent: Dec. 8, 2015

(54) FAIL SAFE CIRCUIT

(71) Applicant: Control Techniques Limited, Newtown (GB)

(72) Inventors: Andrew Jeremy Sykes, Bolton (GB); Richard Mark Wain, Newtown (GB); Colin Hargis, Oswestry (GB)

(73) Assignee: CONTROL TECHNIQUES LIMITED, Newtown (GB)

( * ) Notice: Subject to any disclaimer, the term of this patent is extended or adjusted under 35 U.S.C. 154(b) by 96 days.

(21) Appl. No.: 14/199,453

(22) Filed: Mar. 6, 2014

(65) Prior Publication Data
US 2014/0253008 A1    Sep. 11, 2014

(30) Foreign Application Priority Data

Mar. 8, 2013   (GB) .................................. 1304187.6

(51) Int. Cl.
| H03K 19/00 | (2006.01) |
| H02P 3/22 | (2006.01) |
| H02P 3/02 | (2006.01) |
| H02H 3/24 | (2006.01) |
| H02H 7/08 | (2006.01) |
| H02M 1/32 | (2007.01) |
| H02M 7/5387 | (2007.01) |
| H02M 1/00 | (2007.01) |

(52) U.S. Cl.
CPC .. *H02P 3/02* (2013.01); *H02H 3/24* (2013.01); *H02H 7/0844* (2013.01); *H02M 1/32* (2013.01); *H02M 7/5387* (2013.01); *H02M 2001/0006* (2013.01); *H02P 2201/09* (2013.01)

(58) Field of Classification Search
USPC .................. 327/108, 111–112, 306, 309, 323
See application file for complete search history.

(56) References Cited

U.S. PATENT DOCUMENTS

| 7,514,908 B2 * | 4/2009 | Hosokawa et al. ........... 323/222 |
| 8,749,277 B2 * | 6/2014 | Kenney .......................... 327/109 |
| 2014/0103894 A1 * | 4/2014 | McJimsey et al. ............ 323/282 |

FOREIGN PATENT DOCUMENTS

CN            102255488           11/2011

* cited by examiner

*Primary Examiner* — An Luu
(74) *Attorney, Agent, or Firm* — Harness, Dickey & Pierce, P.L.C.

(57) ABSTRACT

Apparatus for preventing output of an input signal is disclosed. The apparatus comprises a signal control unit comprising a signal buffering unit having an input and an output, the signal buffering unit arranged to receive an input signal and pass the input signal to the output when the signal buffering unit is powered, wherein a negative power supply terminal of the signal buffering unit is arranged to be supplied by a first power source having a voltage. The signal control unit also comprises a boost circuit arranged to boost the voltage of the first power source to a boosted voltage higher than the voltage of the first power source and supply either the voltage of the first power source or the boosted voltage to a positive power supply terminal of the signal buffering unit. The signal buffering unit is powered when the boosted voltage is supplied to the positive power supply terminal of the signal buffering unit and the signal buffering unit is not powered when voltage of the first power supply terminal is supplied to the positive power supply terminal of the signal buffering unit. Also disclosed is an apparatus for providing output voltages for driving a motor as well as a motor drive system.

19 Claims, 9 Drawing Sheets

FAIL SAFE CIRCUIT

CROSS-REFERENCE TO RELATED APPLICATION

This application claims the benefit and priority of Great Britain Patent Application No. 1304187.6 filed Mar. 8, 2013. The entire disclosure of the above application is incorporated herein by reference.

FIELD OF INVENTION

This disclosure relates to a fail safe circuit to enable a control signal to be blocked to prevent operation of a device. More specifically, but not exclusively, a fail safe circuit for use in a drive circuit of a motor drive system is disclosed.

BACKGROUND TO THE INVENTION

Drive circuits are used to drive motors for use in many different applications. There is a need in such applications to provide a means for disabling the motor in the case of an emergency or such like. For example, if a motor connected to a piece of machinery could cause harm to its operator if it continues operation then there is a need to ensure that it stops when instructed to do so. In particular, it is important to ensure that the control system has fail safe functionality included to ensure that the machine stops operation responsive to an initial instruction to stop.

Two key safety standards exist that need to be complied with:

BS EN 61800-5-2:2007 Adjustable speed electrical power drive systems—Safety requirements; and BS EN ISO 13849-1:2008 Safety of machinery—Safety related parts of control systems.

BS EN 61800-5-2 defines the means for disabling the motor driven machinery as Safe Torque Off. It is defined in the Standard BS EN 61800-5-2 as:

Power, that can cause rotation (or motion in the case of a linear motor), is not applied to the motor. The PDS(SR) will not provide energy to the motor which can generate torque (or force in the case of a linear motor). Where PDS(SR)=adjustable speed electrical power drive systems suitable for use in safety related applications.

A common way in which these standards are complied with is by providing a safe torque off (STO) functionality arranged to prevent control signals reaching the switching devices that generate torque producing current in the motor to thereby provide torque. In order to comply with these standards it is necessary for the STO function to achieve a high degree of safety integrity. Hence, the STO function has to have a fail safe means built in to its own functionality.

All modern alternating current motor drive systems use an inverter to generate the controlled alternating voltage to be applied to the motor.

In order to maintain torque in the motor, continual active and co-ordinated switching in the required sequence of the corresponding power semiconductors is needed. Should erroneous conduction of one or more of the power semiconductor devices of the inverter occur, this does not result in sustained torque in the motor. For a motor with a smooth (non-salient) rotor, no torque is produced by any failure of a power semiconductor device of the inverter. For a motor with permanent magnets and/or saliency, a pair of short circuit power semiconductor devices in the inverter could cause a brief alignment torque whereby the motor partially rotates, however, the current would increase rapidly until interrupted by a protection device (for example a fuse) or destructive failure of at least one of the power semiconductor devices.

As a further example, in power grid-connected power generating inverter applications, the same principles apply when the inverter drives a transformer rather than a motor. Erroneous conduction of power semiconductor devices of the inverter cannot produce an alternating flux in the transformer, and therefore cannot produce a sustained output from the transformer secondary coil. In other words, a fault in the inverter power device results in direct current, which cannot be transferred through the transformer because the transformer relies upon alternating current for its operation.

In order for safe and reliable control of such an inverter, an interface is required between the inverter control input terminals which typically use logic signals such as 24V d.c. and the power semiconductors of the inverter that maintains the required low probability of dangerous failure of the inverter.

Electromechanical relays have been used to provide the necessary electrical isolation and electrical level conversion for such an interface. However, relays possess relatively high probabilities of failure in the dangerous direction and have a relatively short time before mechanical wearout. This results in pairs of relays being used accompanied by monitoring to detect fault conditions.

Recently, generation of the power semiconductor control signals for operating the inverter is typically carried out by complex digital electronic circuits and programmable digital processors. Such an arrangement does not provide the required low probability of dangerous failure as most digital circuits can fail with equal probability into either of the available logic states. Further, the complexity of the digital circuits and functions is such that it is difficult to reliably and confidently demonstrate a sufficiently low probability of dangerous failure under all combinations of conditions and sequences of conditions that the circuit may be subjected to during operation. For example, it may be difficult to predict how the circuit reacts under changeable temperature conditions together with each and every possible sequence of combinations of logic levels on each and every pin of the various devices of the circuit.

If complex digital electronic circuits and programmable circuits are to be employed in safety critical functions, typically, at least two independent channels together with diagnostic and cross-checking functions to detect faults or errors are used. These systems allow the disabling of an inverter by way of a channel that is not affected by a particular fault that has been detected. As can be seen, even in such systems, means for disabling the inverter which do not rely on the complex circuits needs to be provided in order to achieve the required low probability of dangerous failure.

It is therefore desirable to have a fail-safe interface, in particular, to an inverter, which employs simple electronic components with well-defined failure modes. In such an interface, it is desired that a very high fraction of component faults, and combinations of component faults, result in a safe failure. In other words, a failure where the inverter is not provided with the required waveform, and hence a motor connected to the inverter is not driven.

SUMMARY OF INVENTION

Features of this disclosure attempt to mitigate at least some of the above-mentioned problems.

In accordance with an aspect of the invention there is provided apparatus for preventing output of an input signal. The apparatus comprising a signal control unit. The signal control unit comprising a signal buffering unit having an input and an output. The signal buffering unit is arranged to receive an input signal and pass the input signal to the output when the signal buffering unit is powered. A negative power supply terminal of the signal buffering unit is arranged to be supplied by a first power source having a voltage. The signal control unit further comprises a boost circuit arranged to boost the voltage of the first power source to a boosted voltage higher than the voltage of the first power source and supply either the voltage of the first power source or the boosted voltage to a positive power supply terminal of the signal buffering unit. The signal buffering unit is powered when the boosted voltage is supplied to the positive power supply terminal of the signal buffering unit and the signal buffering unit is not powered when voltage of the first power supply terminal is supplied to the positive power supply terminal of the signal buffering unit.

The signal buffering unit may be any unit arranged to receive an input signal and output the input signal. Preferably, the signal buffering unit is a buffer.

The boost circuit may be driven by a second power source and the boost circuit may be arranged to provide the voltage of the first power supply to the positive power supply terminal of the signal buffering unit when the second power source is turned off and output the boosted voltage to the positive power supply terminal of the signal buffering unit when the second power source is turned on. The boost circuit may be a step-up converter. The step-up converter may have a switching element, the switching element being switched by an oscillator circuit driven by the second power source The oscillator circuit may include a voltage threshold circuit arranged to prevent switching signals for switching the switching element being output in the event that the oscillator is being driven by a voltage less than a threshold voltage associated with the second voltage source.

The apparatus may further comprise the second power source. The apparatus may further comprise the first power source.

Furthermore, the boost circuit may be prevented from being driven by the second voltage source when the second voltage source is disconnected from the boost circuit. The apparatus may further comprise a control unit arranged to disconnect the second voltage source from the boost circuit for preventing the second voltage source from driving the boost circuit.

The signal buffering unit may comprise two buffers each formed in separate ICs. The two buffers may be arranged in series.

The apparatus may further comprise a voltage monitoring circuit arranged to detect if a voltage supplied to the positive power supply terminal of the signal buffering unit by the boost circuit is less than a threshold voltage associated with the positive power supply terminal. The threshold voltage associated with the positive power supply terminal may be between the boosted voltage and the voltage of the first power source. The threshold voltage associated with the positive power supply terminal may be greater than or equal to the minimum operating voltage of the signal buffering unit.

The signal buffering unit may further comprise a switching arrangement arranged to prevent an input signal passing from the input to the output of the signal buffering unit. The switching arrangement of the signal buffering unit may be switchable responsive to the voltage monitoring circuit detecting that the voltage supplied to the positive power supply terminal of the signal buffering unit is less than the threshold voltage.

The apparatus may further comprise a further signal control unit provided according to a signal control unit as described in anyway herein. The further signal control unit may be provided in series with the signal control unit that is provided as described in anyway herein. Hence, first and second control units may be provided in series.

The voltage monitoring circuit may monitor both of the signal control units.

The input signal arranged to be received by the signal buffering unit may be a control signal for controlling the switching of a switching arrangement for driving a motor.

In accordance with another aspect of the invention there is provided an apparatus for providing output voltages for driving a motor. The apparatus comprises a first switching arrangement arranged for supplying a first output voltage responsive to a first control signal, the first switching arrangement powered by a first power supply. The apparatus also comprises a second switching arrangement arranged for supplying a second output voltage responsive to a second control signal. The first and second control signals are arranged to respectively switch the first and second switching arrangements on at different instants in time. Furthermore, the apparatus comprises a power storage arrangement arranged to be charged by the first power supply when the first switching arrangement is supplying the first output voltage and arranged to power the second switching arrangement when the second switching arrangement is supplying the second output voltage. In addition, the apparatus comprises a control unit arranged to prevent the supply of the first and second output voltages by preventing the supply of control signals to the first switching arrangement.

The first and second switching arrangements may each comprise a switching element and a driving unit. Each driving unit may be arranged to apply a signal to the respective switching element of the switching arrangement responsive to receipt of the respective control signal.

The power storage arrangement may be a bootstrap circuit.

The first and second output voltages may be for driving a motor.

The apparatus may be arranged to provide output voltages corresponding to one phase of a three phase motor drive system.

The control unit may be an apparatus as described anywhere herein. In particular, the control unit may be any apparatus for preventing output of an input signal as disclosed herein.

According to another aspect of the invention there is provided a motor drive system comprising a three-phase motor and a drive unit comprising driving arrangements for each phase. The driving arrangement for each phase may be provided according to any apparatus for providing output voltages for driving a motor as disclosed herein.

The motor drive system may further comprise a controller for producing control signals including the first and second control signals.

Aspects of this disclosure attempt to provide a low cost system for providing fail safe functionality.

In accordance with certain aspects of this disclosure, an upper IGBT gate driver is powered using a bootstrap circuit. Consequently, an upper IGBT is unable to switch on if an associated lower IGBT has not been switched on first and the upper IGBT will lose its power supply a short time after the lower IGBT stops switching due to the bootstrap capacitor losing its stored power. This arrangement permits use of a simple STO circuit, whereby only the lower IGBTs are prevented from switching when the STO is activated. The number of components and therefore cost of the STO is reduced.

Aspects of the invention provide a system whereby a power board control supply, which includes the 3 inverter lower IGBT gate driver supplies, is referenced to the negative terminal of the DC bus. There is therefore no need for galvanic isolation between the processor gate pulse output signals and the 3 inverter lower IGBT gate drivers.

In at least one aspect of the disclosure, when the STO is activated the STO prevents the processor gate pulse output signals for the lower IGBTs from reaching the input of the IGBT gate drivers. This may be achieved by inserting buffers in the control signal path. The buffers may be controlled to pass the signals when the STO is not activated and block the signals when the STO is activated. Two STO channels may be provided by connecting two buffers in series. Providing two STO channels enables the external safety circuits which provide the STO input signals to use a self-checking function, whereby they can check for and detect a failure that could send the STO a false de-activation signal, upon every powering up. If such a failure is detected, the second STO channel can be used to safely disable the drive until remedial action can be taken to repair the fault.

Aspects of the disclosure use redundancy to prevent an unsafe component failure from compromising the safety integrity of the STO.

According to aspects of the disclosure fail-safe, non-isolated buffers may be used to pass/stop the inverter IGBT pulses for the STO.

In accordance with aspects of the disclosure one or more of the following advantages can be provided:

1. The signal propagation delays affecting the turn on and turn off of the inverter lower IGBTs may be very small, e.g. <200 ns. Such a delay is so small that no additional measures are required in the processor's pulse generator to account for the delay.

2. The design may be inherently safe and most component failures will be revealed by stopping the inverter. Where this is not the case, redundancy is used to achieve an incredibly low dangerous failure rate, so low that the failure analysis is not required to include it. The safety integrity is so high that it may allow for the elimination of electro-mechanical contactors, which would otherwise be required.

3. The hardware component count may be lower than that of previous designs. This results in a lower material cost.

4. The circuit topology may lend itself to easy bi-pass of the STO function. If STO is not required, the pluggable STO card is replaced by very simple bi-pass card, which comprises a connector and a very small PCB with no other components. The bi-pass card connects the STO card input signals to what would be the STO card outputs if STO was used. This allows a lower cost non-STO option to be configured at final assembly of the drive. The drive's control software may be identical between STO and non-STO variants.

BRIEF DESCRIPTION OF THE DRAWINGS

Exemplary embodiments of the invention shall now be described with reference to the drawings in which.

Throughout the description and the drawings, like reference numerals refer to like parts.

SPECIFIC DESCRIPTION

Figure 1:
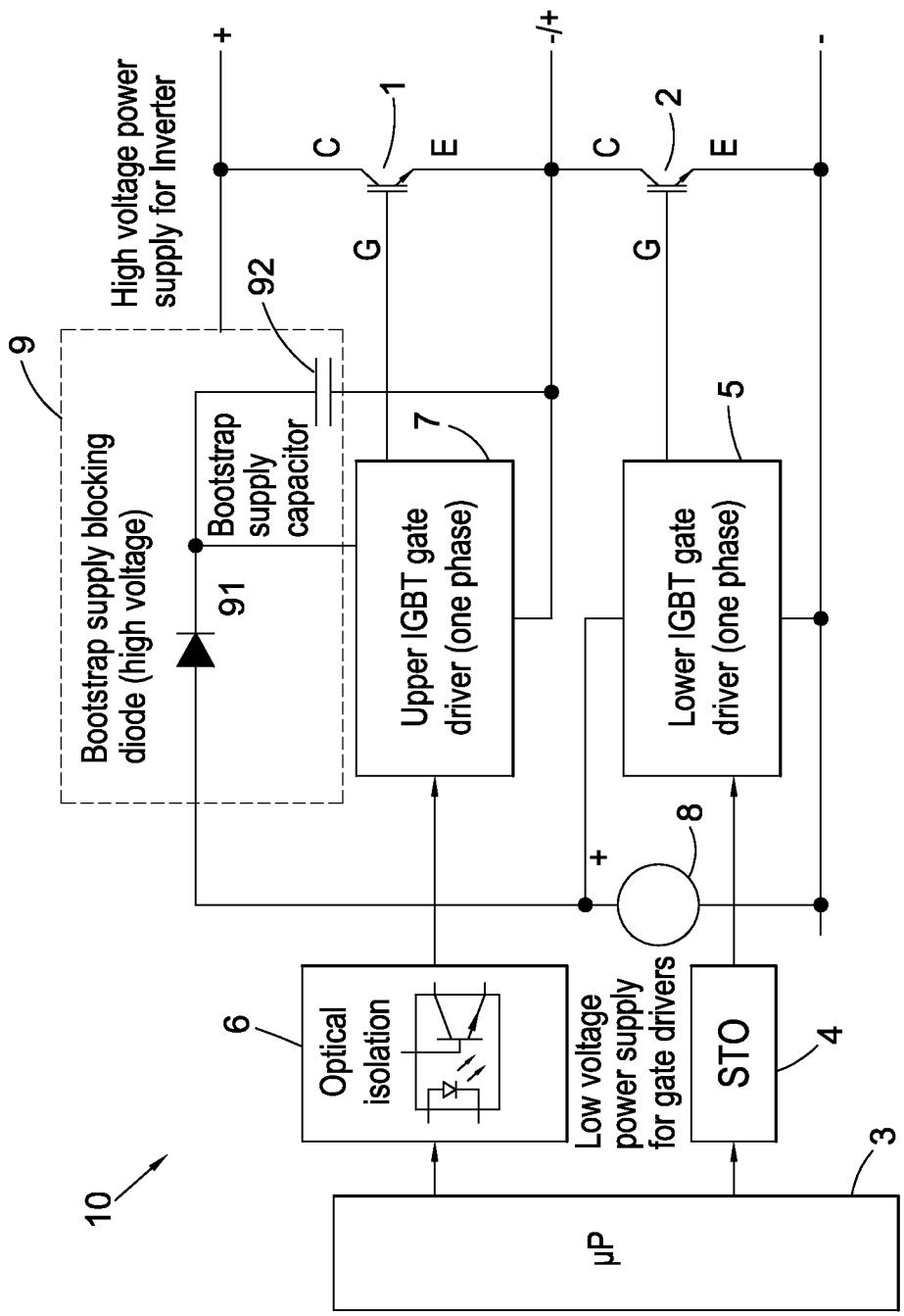
FIG. 1 shows a drive circuit including fail safe functionality for one phase of a three phase drive system.

FIG. 1 shows a drive circuit 10 including fail safe functionality for one phase of a three phase drive system. In particular, the system of FIG. 1 relates to one phase of a three phase motor drive system comprising an arrangement of three primary or upper transistors and three secondary or lower transistors, the upper and lower transistors each being arranged in pairs. In FIG. 1, the upper transistor 1 and lower transistor 2 for the first phase are shown. The gates of the transistors are switched responsive to control signals generated by the microprocessor 3. The generation of the control signals and operation of the switching of the transistors for the purpose of providing a rotational torque to a motor shall not be discussed herein because such functionality is well-known in the art. Furthermore, only one phase of the three phases shall be explained herein because the other phases are simply a repetition of the first phase.

The microprocessor 3 generates control signals for operation of the lower transistor 2, which firstly pass through the Safe Torque Off (STO) unit 4. As will be discussed in more detail, the STO unit 4 is arranged to block the transmission of such control signals when required, for example when the motor needs to be prevented from working due to a situation in which torque being applied to the motor could result in danger. The output of the STO feeds the control signals to the lower IGBT gate driver 5, which amplifies the control signal to a voltage level suitable for switching of the gate of the lower transistor 2. Generally, the voltage between the gate and emitter is set at +16V to switch the transistor on. When the gate of the lower transistor is on, power can be transmitted from the collector to emitter for powering of the motor.

In a similar way to controlling the lower transistor 2, the upper transistor 1 is controlled by a control signal generated by the microprocessor 3. This control signal firstly passes through an optical isolation unit 6. The optical isolation unit 6 provides level shifting between the control signal (referenced to the power "−" rail) and the upper transistor gate driver (referenced to the upper transistor emitter (E) terminal). The signal output by the optical isolation unit 6 then passes to the upper IGBT gate driver 7, which amplifies the control signal to a level suitable for driving the gate of the upper transistor 1. When the gate of the upper transistor 1 is on, power can be transmitted from the collector to emitter for powering of the motor. At this point the lower transistor 2 is off due to the switching pattern generated by the microprocessor required to provide the sinusoidal voltage to the motor. The lower IGBT gate driver 5 is powered by a power source 8 that is connected to the positive and negative terminals of the lower IGBT gate driver 5. The upper IGBT gate driver 7 is powered by a bootstrap circuit 9, which comprises a diode 91 and a capacitor 92. The diode 91 has its anode connected to the positive terminal of the power source 8 and its cathode connected to the positive terminal of the upper IGBT gate driver 7 and a first plate of the capacitor 92. A second plate of the capacitor 92 is connected to the negative terminal of upper IGBT gate driver 7 in addition to the node connecting the emitter of the upper transistor 1 to the collector of the lower transistor 2. Current therefore passes through the diode 91 and the lower transistor 2 from the power source 8 to charge the capacitor 92 when the lower transistor 2 is switched on. When the lower transistor 2 is switched off the upper transistor gate driver 7 is supplied by energy stored in capacitor 92. Diode 91 is blocking when upper transistor 1 is switched on. The control of the inverter is designed to maintain the energy stored in capacitor 92 by switching on the lower transistor 2 with low enough periodicity.

In order to maintain torque in the motor, continuous and co-ordinated switching, in the required sequence, of the upper and lower transistors is required. Hence, in the arrangement of FIG. 1, the STO unit 4 is only required in the communication line of the lower transistor 2 control signals because preventing the lower transistor 2 from switching on also prevents the upper transistor 1 from switching on because it prevents capacitor 92 charging, which in turn prevents the upper IGBT gate driver being powered for switching upper transistor 1. This arrangement therefore reduces the complexity and therefore cost of STO circuitry required because an STO circuit is only required for one of the two transistors to prevent operation of both of the transistors.

Figure 2:
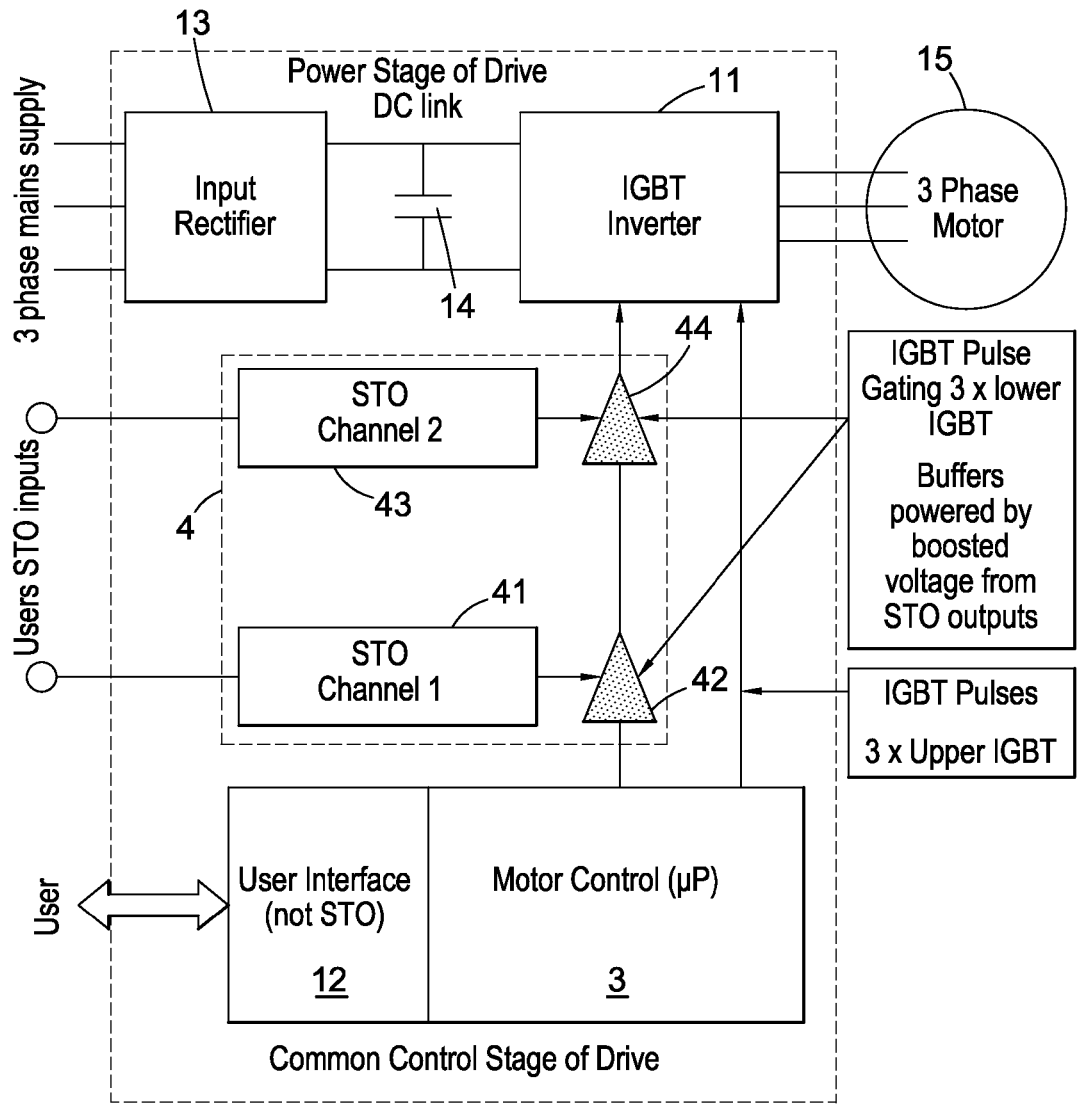
FIG. 2 is a block diagram of a complete motor drive highlighting the safety circuits of the STO unit shown in FIG. 1.

FIG. 2 is a block diagram highlighting the safety circuits of the STO unit 4 shown in FIG. 1. It can be seen that the STO unit 4, as in FIG. 1, is positioned between the microprocessor 3 and the IGBT inverter 11, which is the arrangement of the upper and lower gate drivers 5, 7 and the upper and lower transistors 1, 2. FIG. 2 shows how the microprocessor includes a user interface 12 for the user to control the operation of the microprocessor 3. Furthermore, FIG. 2 shows how the power supplied to the IGBT inverter includes an input rectifier 13 to convert a three phase AC mains supply into a DC supply, and a capacitor 14 between the rectifier 13 and the IGBT inverter 11 to provide a smoothed DC voltage and local energy supply for inversion by the IGBT inverter 11. The IGBT inverter then outputs synthesised alternating voltage under control of the microprocessor 3 to control the three-phase motor 15.

The STO unit 4 comprises two identical stages comprising a first STO channel unit 41 arranged to enable a first channel buffers 42 to pass or block control signals, and a second STO channel unit 43 to control the second channel buffers 44 for passing or blocking of control signals. Both the first and second STO channel units are controlled by a user control signal. The user control signal will typically be from external safety control equipment, such as a programmable logic controller (PLC), the external safety equipment having its own voltage source and thereby an input and a return path. Providing two STO channels enables the external safety equipment to use a self-checking function, whereby the safety equipment can check for and detect a failure that could send the STO a false de-activation signal, upon every powering up. If such a failure is detected, the second STO channel can be used to safely disable the drive until remedial action can be taken to repair the fault.

Figure 3:
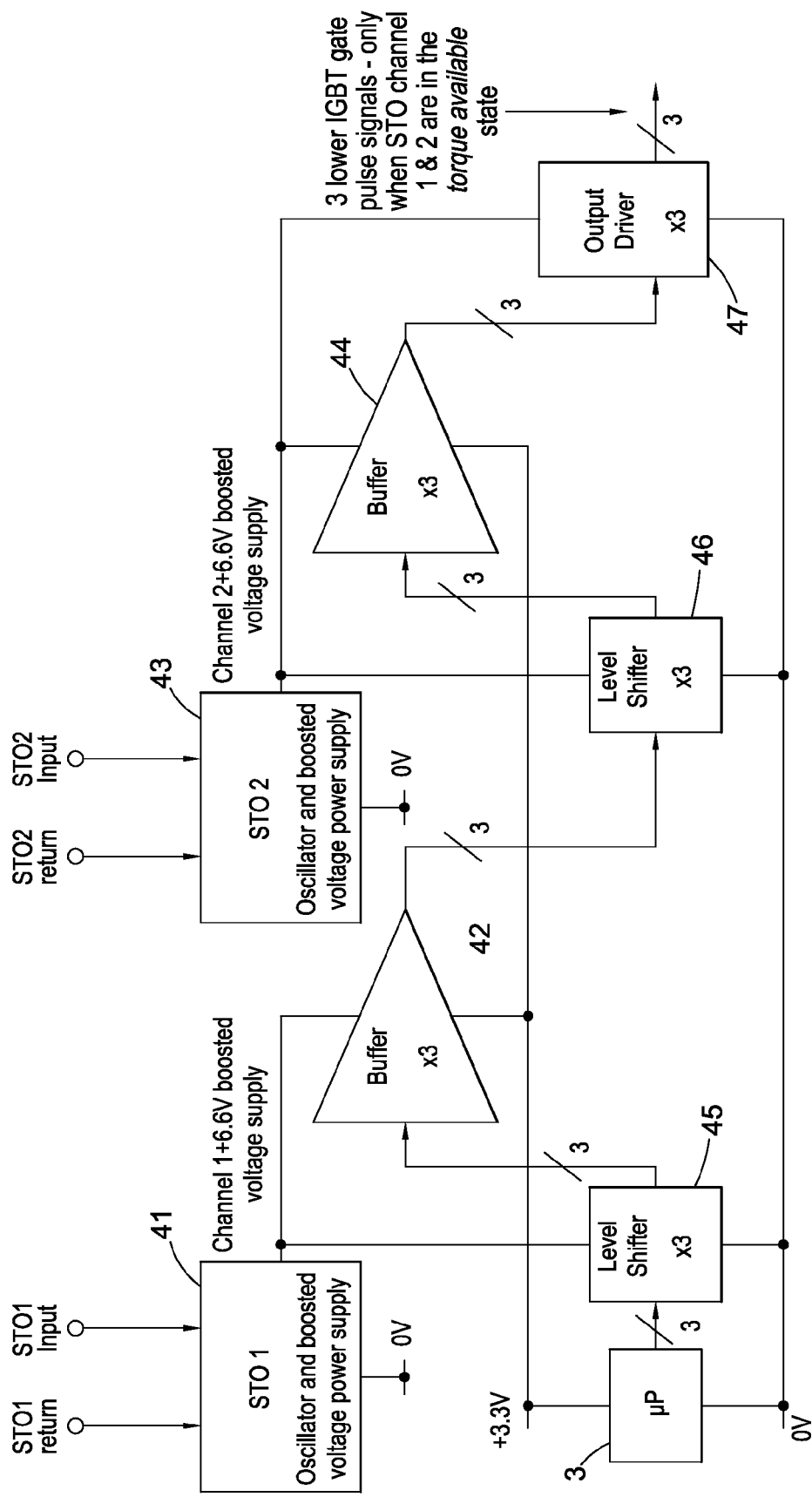
FIG. 3 provides a more detailed block diagram depiction of the functionality of the STO unit shown in FIGS. 1 and 2.

FIG. 3 provides a detailed schematic depiction of the functionality of STO unit 4. It can be seen how the microprocessor 3 outputs the control signals, the level of each control signal is then shifted by level shifter 45 to a level suitable for input into the buffer 42. When the buffer 42 is in a state arranged to enable the control signal to pass therethrough, the control signal then passes into the next series level shifter 46, then into the next buffer 44 when the buffer 44 is in a state arranged to enable the control signal to pass therethrough, and the control signal is then output to the output driver 47. Hence, the buffers are arranged in series so that if one of the buffers allows the control signal through when it should not, due to a malfunction in its operation or a malfunction in the external safety circuit controlling the STO Input, the other buffer will stop the control signal passing to the output driver. This dual signal flow prevention mechanism is a failsafe functionality of the STO unit 4.

Each buffer 42, 44 has its negative power supply terminal connected to the positive power supply rail that is powering the microprocessor. The positive power supply terminals of the buffers 42, 44 are each connected to the respective STO channel units 41, 43, which provide a boosted power supply to the positive terminal of the respective buffers 42, 44. The STO channel units 41, 43 are able to prevent their respective buffers from allowing the control signals to pass therethrough by no longer providing a boosted power supply to the positive terminals of the respective buffers 42, 44. The buffers are not able to pass a signal from their input to their output when they are not receiving power from the STO channel units 41, 43. Whether or not the STO channel units output a boosted power to the buffers 42, 44 or not is controlled by an input signal, which may be input by a user or automated responsive to certain hazardous conditions that are sensed.

When the channel 1 User STO input is connected to 24V the STO unit 41 generates the positive boost rail for channel 1 which is 3.3V above the microprocessor control power supply rail (also 3.3V), allowing the pulse gating circuit or buffer 42 to pass the IGBT gate control pulses generated by the microprocessor 3 to the second STO channel. When the safe state is required, i.e. the user STO input is either open circuit or connected to 0V, the STO unit 41 is unable to generate the boost rail and the voltage on this rail falls to the same level as the microprocessor control power supply rail. Whatever the demand from the microprocessor 3, the STO channel 2 circuit will not be able to receive the IGBT gate control pulses from the channel 1 circuit. Consequently, the lower IGBTs are not able to switch under the control of the microprocessor. The second channel is similar in function to the first channel except when the user STO input is connected to 24V the STO unit 43 generates the positive boost rail for channel 2, which is 3.3V above the microprocessor control power supply rail.

It is noted that the STO Input/Return signals are galvanically isolated from the +6.6V power supply. This provides isolation from the drive's main power circuit.

The functionality of the first STO channel unit 41 shall now be described in more detail with reference to FIG. 4, which shows the circuit for the first STO channel unit. It will be appreciated that the second STO channel unit has the same functionality as the first STO channel unit.

Figure 4:
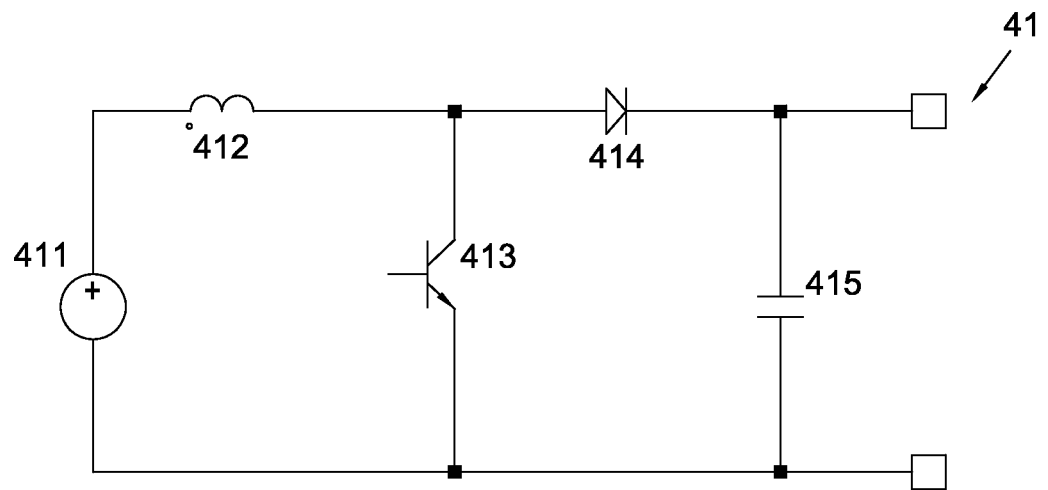
FIG. 4 shows a step-up converter forming part of the STO unit shown in FIG. 3.

The circuit of FIG. 4 is a step-up converter. Power is received from a 3.3V control supply 411 used by the drive's microprocessor and associated interfaces. The 3.3V supply's 0V rail is connected to the negative power rail of the DC output of the main rectifier supplying the inverter. The transistor 413 is arranged to oscillate ON and OFF responsive to a control signal applied to the gate of the transistor. When the transistor 413 is conducting, energy supplied by the supply 411 is stored in the inductor 412. The energy stored in the inductor 412 is then released through the diode 414 when the transistor 413 turns off and this energy is then stored in capacitor 415. The energy stored in the capacitor, which is in parallel with the output load (i.e. the positive power supply of the buffer 42), also supplies power to the output. Consequently, the input is boosted from 3.3V to a 6.6V output The STO channel unit 41 therefore also includes an oscillator as well as the boost circuit shown in FIG. 4, the oscillator controlling the switching of the transistor 413 with a reasonably fixed frequency and duty cycle, thus delivering a reasonably constant power to the load, i.e. the buffer.

Figure 5:
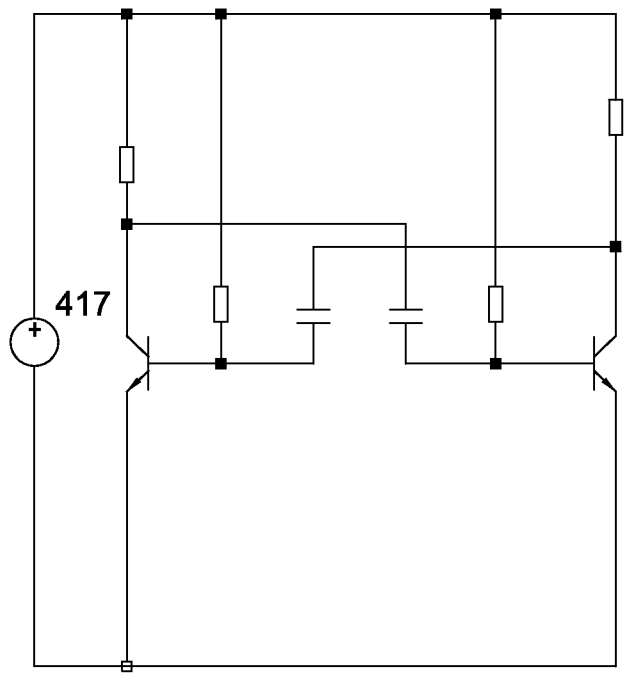
FIG. 5 illustrates a simple oscillator circuit suitable for use in driving the step-up converter shown in FIG. 4.

FIG. 5 illustrates a simple circuit of the oscillator 416 which can be used to drive the transistor 413. The circuit of FIG. 5 is an astable multivibrator using two npn bipolar transistors powered by a voltage source 417. The voltage source 417 is separate from the voltage source powering the other components of the system. The oscillator is a standard oscillator circuit and its operation will therefore not be described in further detail.

Figure 6:
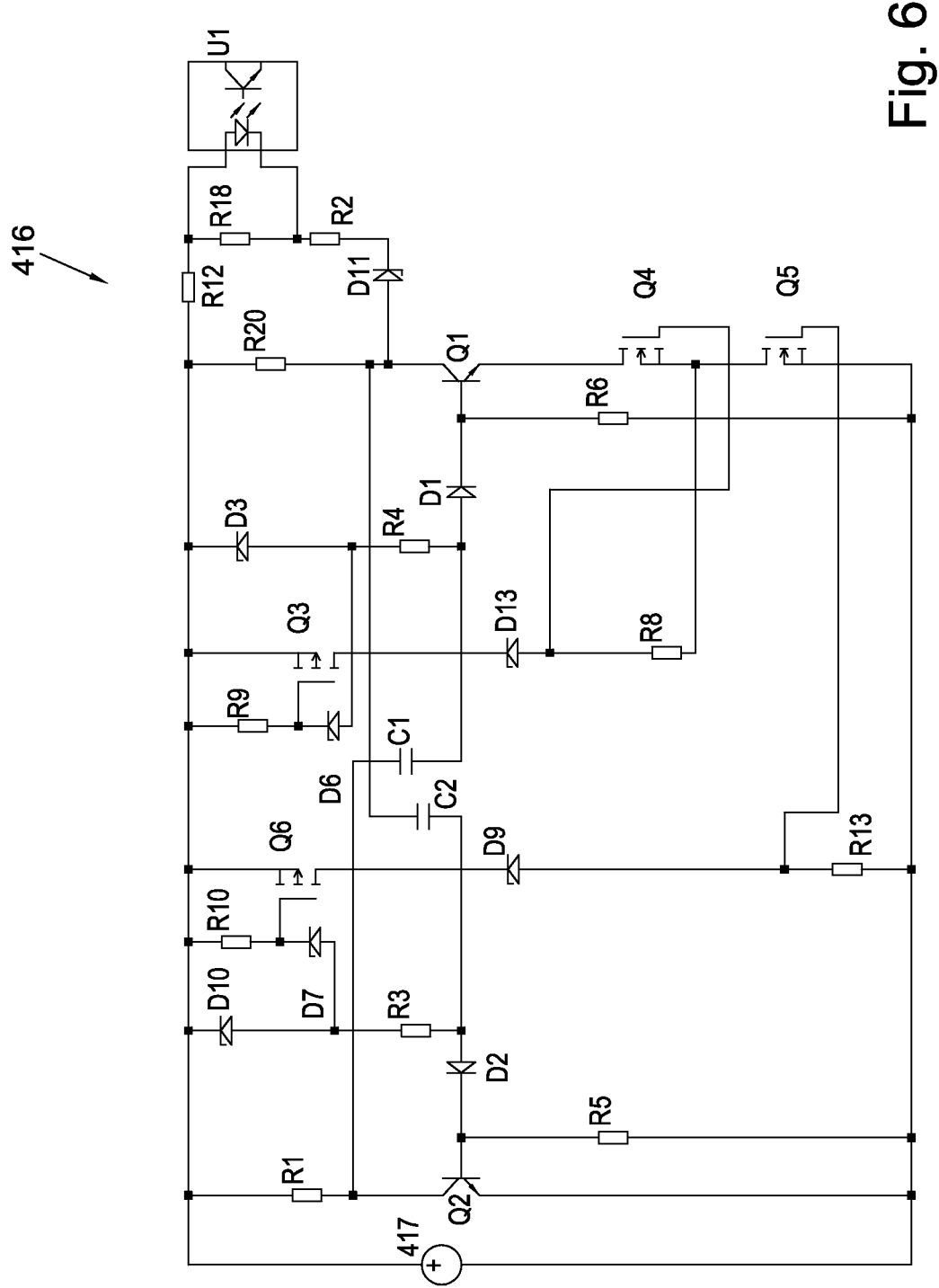
FIG. 6 shows an alternative advanced oscillator circuit used to drive the step-up converter shown in FIG. 4.

FIG. 6 shows an alternative advanced oscillator circuit used to drive the transistor 413. This oscillator is designed with various special features arranged to improve safety and is therefore preferable over the simple circuit shown in FIG. 5 when safety is of importance.

A voltage threshold circuit is provided whereby zener diodes D3 and D10 are placed in the feed to the base of transistors Q1 and Q2. These zener diodes are used to stop oscillation starting if the supply voltage 417 is below a threshold level. This threshold level must be greater than the minimum voltage of the STO input for no oscillation, defined by the relevant safety standards.

The voltage supply 417 for the oscillator 416 is the input signal from the external safe torque off safety circuits. The external safe torque off safety circuit is typically a safety PLC with a suitable output interface. Zener diodes D6 and D7 are used to monitor the voltage of zener diodes D3 and D10. If D3 or D10 fails to a low voltage it compromises the safety of the STO. This is detected by the circuits comprising components D7, R10 and Q6, or D6, R9 and Q3. Transistor Q6 or Q3 will be switched off if the voltage of zener diode D10 or D3 is low. This will result in the oscillator not operating at any value of voltage supply 417, owing to each of transistors Q6 and Q3 not providing the gate drive voltage for transistors Q5 and Q4. Transistors Q4 and Q5 must be switched on to connect the oscillator transistor Q1 emitter to the 0V rail of the power supply 417 and allow oscillation to take place. Additional integrity is provided by including two more zener diodes in the gate drives for transistors Q4 and Q5. Zener diodes D13 and D9 do not conduct until the supply voltage 417 is above the minimum voltage of the STO input for no oscillation. A further level of integrity is included by inserting the zener diode D11 in series with the optical isolator U1 LED.

Taking into account all the additional measures for safety integrity described above, a total of 5 component failures is required before the oscillator will oscillate at a level of supply voltage 417 that is below the minimum voltage of the STO input for no oscillation, defined by the relevant safety standards. This results in the probability of an unsafe condition for the STO, i.e. oscillation occurring with supply voltage 417 (=STO input voltage) below the level defined by the relevant safety standards, that is incredibly low, so low that it need not be considered by the failure mode and effect analysis that is performed to demonstrate adequate safety integrity is provided.

When voltage supply 417 is less than the level defined by the relevant safety standards the oscillator's functionality is disabled, consequently the transistor 413 of boost circuit cannot be switched because it is driven by the output of the optical isolator U1 at the output of the oscillator of FIG. 6, a boosted voltage cannot be output and the buffer is not supplied with power to enable it to pass any control signals.

Isolation is required between the oscillator 416 and the other parts of the STO circuit 4, which are tied to the negative power rail of the inverter power circuit. The isolation is provided by an optical isolator U1 at the output of the oscillator.

The essential safety aspect of using a boosted voltage (i.e. >3.3V) produced by STO channel units 41, 43 is that it is a voltage not present elsewhere in the safe torque off circuits. Therefore, if the boost voltage circuit is stopped it is not possible for a voltage >3.3V to be connected to the pulse gating circuits from any other source in the event of a failure that connects two points on the circuit board. In other words, the use of a switching step-up power supply gives the following safety benefits:

The boosted voltage output cannot be produced unless the oscillator driving the input is running.

If the oscillator input drive signal is not present no component failure within the switch-mode circuit will result in an output voltage higher than the +3.3V_PWR input voltage.

If the output voltage is no higher than the +3.3V_PWR input voltage the PWM gating circuits that use the boosted voltage rail output as their supply cannot pass the PWM gating signal to the IGBT gate drivers.

The operation of the buffers 42 and 44 shall now be discussed in further detail.

As already discussed, the basic principle of the buffers 42, 44 is that a switched logic input signal corresponding to a control signal produced by the microcontroller 3 is passed to the output of the second buffer 44 when the boosted voltage is present on both STO channels. Low propagation delay is required to prevent any distortion of the signal produced by the control before it is passed to the lower gate driver 5.

The inverting buffer integrated circuits (IC's) used in the complete circuits of buffers 42 and 44 are of a standard form and shall therefore not be described in detail. Additional circuitry is required in order to reduce the probability of an error occurring in the buffer 42 or 44 that could compromise the safety requirements of the STO unit 4. For example, one particular failure mode risk for the inverting buffer IC is the risk of a short circuit from the input to the output. Clearly such a short circuit would pass a control signal through even if the inverting buffer IC power supply is not present.

Figure 7:
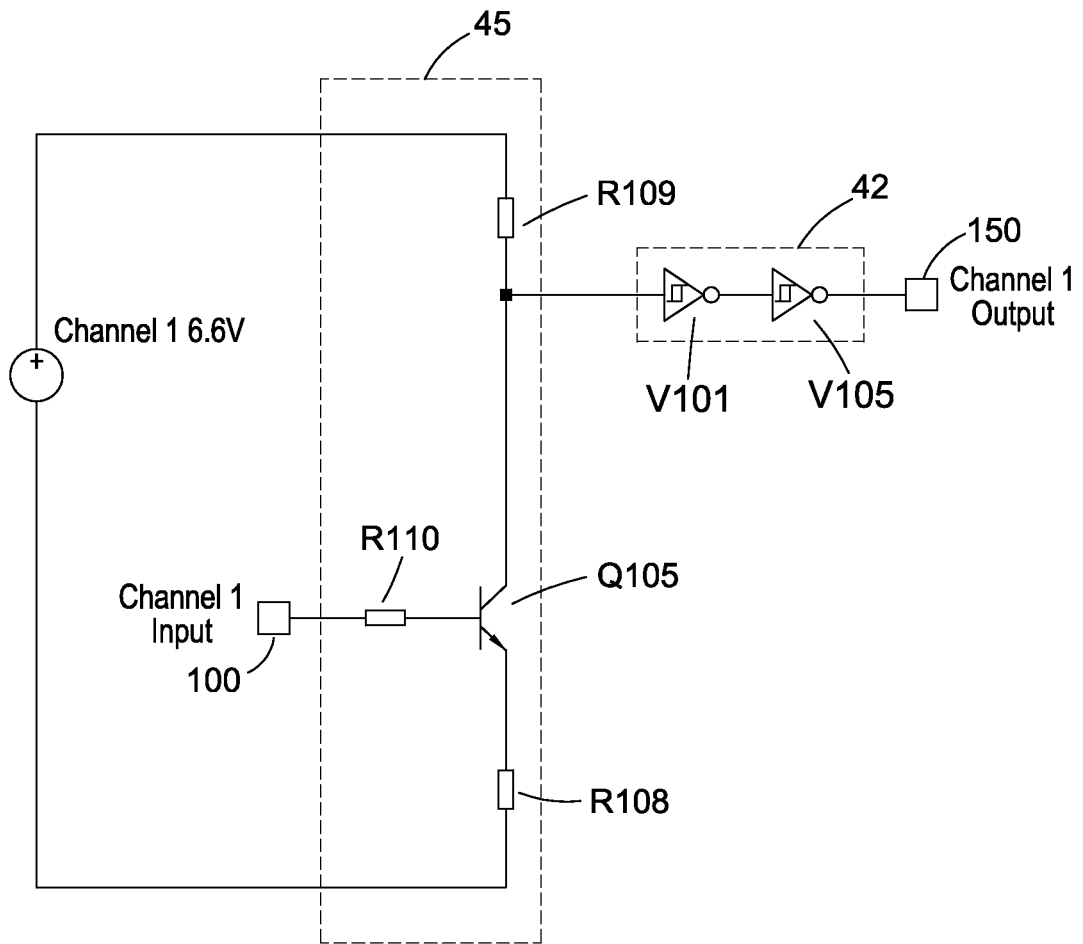
FIG. 7 shows the circuit of the STO channel 1 level shifter and the STO channel 1 buffer of FIG. 3 for one of the three inverter channels.

The circuit of level shifter 45 and buffer 42 is shown in FIG. 7 for one of the three inverter channels. The inverter gating pulses from the microprocessor 3 are input to level shifter 45 at the input to Channel 1, 100. The level shifter comprises resistors R110, R108 and R109 and npn transistor Q105. The zero to +3.3V signal from the microprocessor 3 is converted to a signal switching between approximately +3.3V and +6.6V. Two series connected inverting buffer IC's U101 and U105 are used to feed the level shifter output signal to the output 150. U101 and U105 are represented by buffer 42 in FIG. 3. The inverting buffer IC's U101 and U105 have their positive power supply pins connected to Channel 1 6.6V and their ground supply pins connected to the +3.3V power supply of the microprocessor 3. Therefore, the gating pulse signals do not pass if the boosted power supply, Channel 1 6.6V is not present. This is the primary function of the circuit.

In order to provide a high integrity safety level in the event of a component failure, all credible failure modes must be considered. For the level shifter 45 and buffer 42 there is only one failure mode that requires mitigation:

Two inverting buffer IC's U101 and U105 are connected in series and they must be from separate integrated circuits to mitigate against a specific failure mode included in the fault tables of BS EN 61800-5-2:2007: "short circuit between any two connections". If a single non-inverting buffer IC is used and it fails with a short from input to output it is possible with some failure modes of the surrounding components for a signal to appear at the output when there is no boosted voltage supply to the circuit. Using two inverting buffers IC's in series from different integrated circuits mitigates this single failure of a non-inverting buffer. In addition, it has the benefit of revealing the first failure, so that accumulated unrevealed faults (for example, the second inverting buffer fails with a short from input to output) cannot occur. This is because if a lower switch of the IGBT inverter has its PWM signal inverted, which is the case if one of the inverting buffers fails shorted from input to output, there will be simultaneous switch on of the upper and lower inverter IGBTs 1 and 2 in FIG. 1. The control will latch the drive off after a hardware overcurrent is detected.

Figure 8:
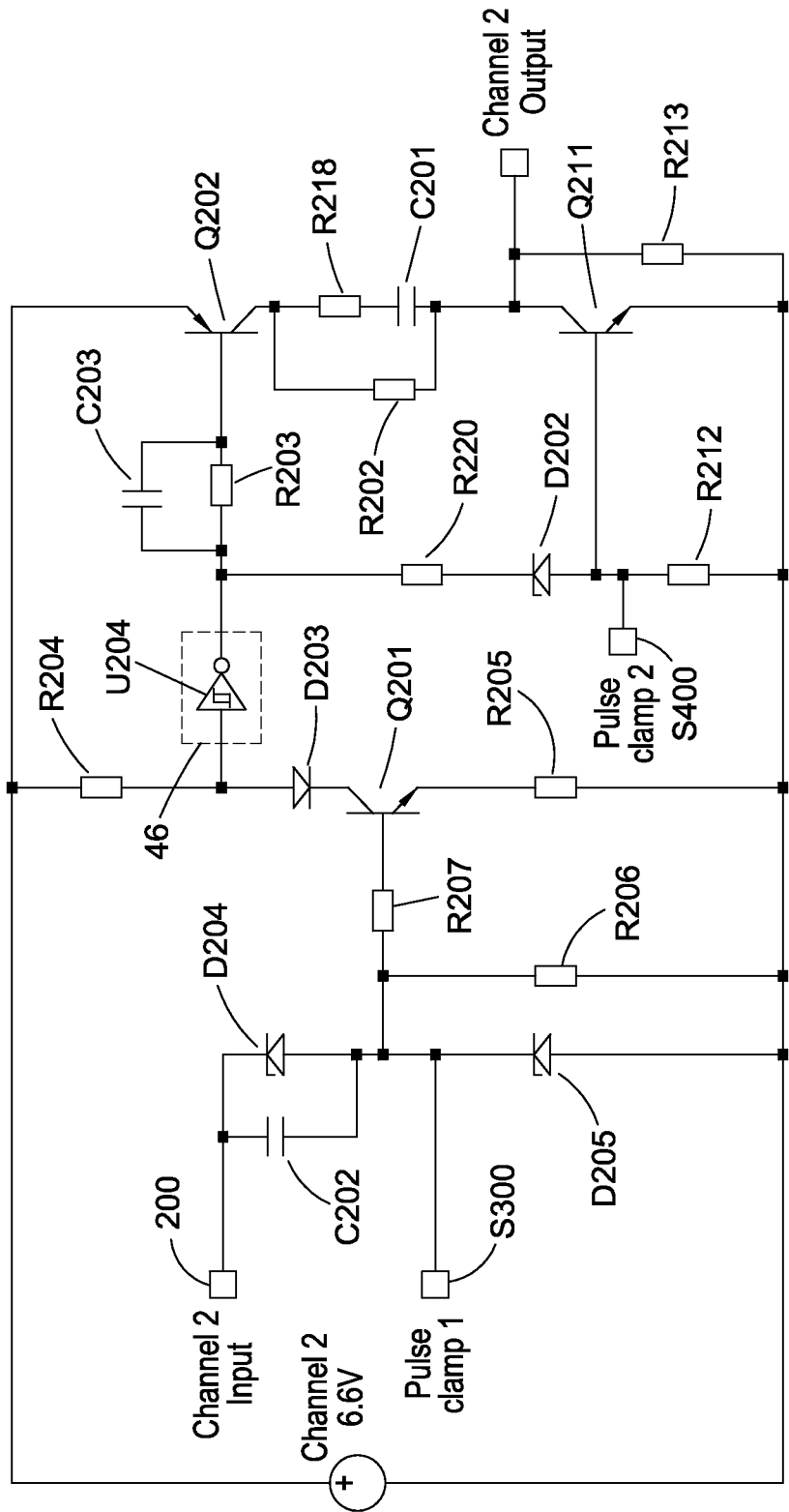
FIG. 8 shows the circuit of the STO channel 2 level shifter and the STO channel 2 buffer of FIG. 3 for one of the three inverter channels.

The circuit of level shifter 46, buffer 44 and output driver 47 is shown in FIG. 8. The inverter gating pulses from the Channel 1 buffer 42 are input to level shifter 46 at Channel 2 Input 200. This signal is switching between +3.3V and +6.6V. The design of the level shifter 46 is strongly influenced by a requirement that no single component failure must allow the boosted voltage rail of Channel 2 to be charged via the level shifter 46. The condition where STO Channel 2 has no boosted voltage rail is a valid condition if the STO is activated but a failure in the external STO circuit for Channel 1 prevents the removal of the STO signal from Channel 1 input:

The npn transistor Q201 provides an inversion. It is driven on when the output of the second inverting buffer IC in Channel 1 is HIGH, corresponding to a gate input signal from the microprocessor 3 that is LOW (=inverter IGBT OFF). Zener diode D204 blocks and Q201 turns off when the output of the second inverting buffer IC in Channel 1 is LOW, corresponding to a gate input signal from the microprocessor 3 that is HIGH (=inverter IGBT ON).

Capacitor C202 is used to speed up the turn off of Q201.

Zener diode D205 and diode D203 are not necessary for the function of the level shifter but are used as second and third tiers of safety, i.e. they must fail in a specific mode before the boosted voltage rail of Channel 2 can be charged via the output circuit of Channel 1.

A loss of the STO safety function is theoretically possible if all of the following failures occur (the boosted voltage rail of Channel 2 can be charged via the level shifter 46):

1. Zener diode D204 fails short circuit or low voltage OR capacitor C202 fails short circuit.
2. Zener diode D205 fails open circuit or high voltage.
3. Diode D203 fails short circuit.

If all three of the above failures occur then, when the output of second inverting buffer IC in Channel 1 is HIGH, Q201 base-collector junction is forward biased and the filter capacitors for the boosted voltage rail of the STO Channel 2 can charge through resistor R204.

Taking into account the additional components D205 and D203 which are added for increased safety integrity as described above, a total of 3 component failures is required before the filter capacitors for the boosted voltage rail of the STO Channel 2 can charge through resistor R204. This results in the probability of an unsafe condition for the STO that is incredibly low, so low that it need not be considered by the failure mode and effect analysis that is performed to demonstrate adequate safety integrity is provided.

Buffer 46 comprises 1 inverting buffer IC U204. U204 has its positive power supply pin connected to Channel 2 6.6V and its ground supply pin connected to the +3.3V power supply of the microprocessor 3. Therefore, the gating pulse signals do not pass if the boosted power supply, Channel 2 6.6V is not present. This is the primary function of the circuit.

An inversion is provided by Q201 in the level shifter 46. Therefore, when the gate input signal from the microprocessor 3 to level shifter 45 is HIGH (=inverter IGBT ON), U204 output is at +3.3V.

As for the Channel 1 buffer circuit, all credible failure modes must be considered when assessing the safety integrity of the Channel 2 buffer. In Channel 2 buffer a single inverting buffer IC is used to pass/stop the gate pulses. The failure mode that results in a short from input to output of the inverting buffer IC is mitigated by the fact that it is revealed by the lower transistor 2 gate signal becoming inverted. This will result in simultaneous conduction of both upper 1 and lower 2 transistors of the inverter phase affected and this will reveal the failure by preventing operation of the inverter, either by detection of the high current that flows as a result thereby stopping the inverter with a fault indicated, or destruction of the inverter IGBT or breaking of the drive supply fuse or circuit breaker if the current detection fails.

U204 (buffer 44) output feeds Output Driver 47, a circuit designed to interface with an n-channel MOSFET at the input to the lower inverter IGBT gate drive 5. Q202 turns on and Q211 turns off when the buffer 46 output is LOW (=+3.3V), corresponding to a gate input signal from the microprocessor 3 to level shifter 45 that is HIGH (=inverter IGBT ON).

Q202 turns off and Q211 turns on when the buffer 46 output is HIGH (=+6.6V), corresponding to a gate input signal from the microprocessor 3 to level shifter 45 that is LOW (=inverter IGBT OFF). Using an npn transistor Q211 to actively pull down the output voltage ensures a fast turn off of the n-channel MOSFET at the gate drive input. It also provides low impedance in the IGBT off state to protect against possible spurious turn on from electro-magnetic effects.

The circuit nodes Pulse clamp 1 s300 and Pulse clamp 2 s400 shown in FIG. 8 are inputs used to turn on transistors Q201 and Q211 respectively. The function of these inputs is described below.

In order to provide a safe switch off of the motor when the STO circuit stops control signals from being transmitted through to the gate drivers (5 and 7) of the inverter IGBTs, a boosted voltage monitoring circuit is provided. If the monitor was not used, the control signals generated by the microprocessor would be modified by the unpredictable behaviour of the inverting buffer ICs when their supply is decaying and passing through a region of unknown behaviour, before it completely stops giving an output signal. This will result in a high risk of simultaneous conduction of the upper 1 and lower 2 IGBTs of the inverter and a trip of the drive triggered by detection of the resulting high current.

Figure 9:
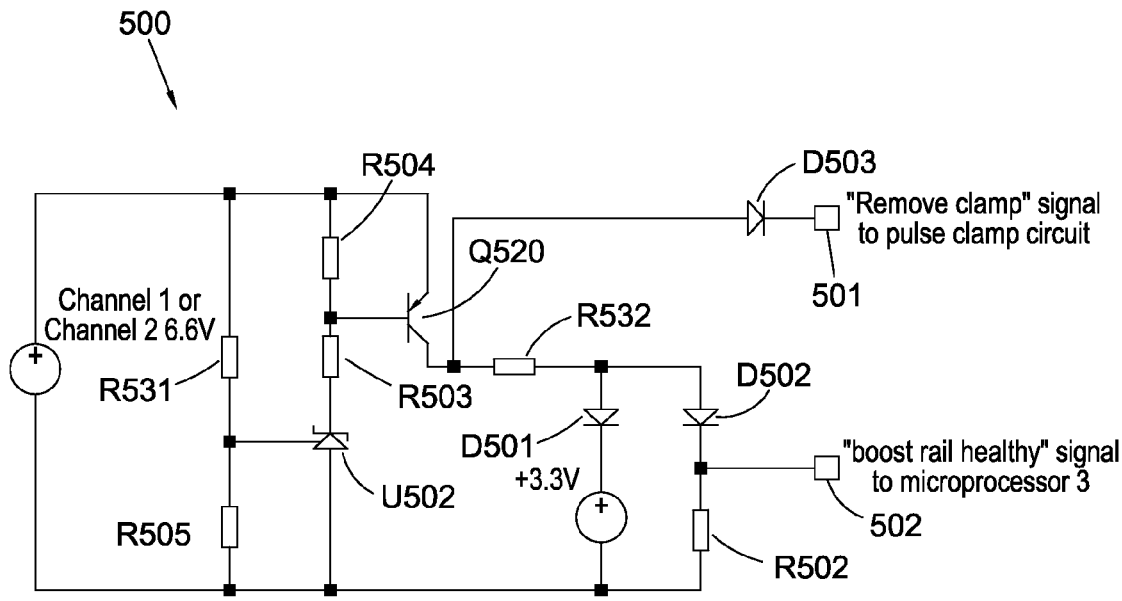
FIG. 9 shows the circuit diagram of a monitor circuit.

The monitoring circuit, which is shown in FIG. 9, monitors the voltage being produced by the voltage boost circuit of FIG. 4. In particular, the monitoring circuit detects when the boosted voltage drops below a value between 3.3V and 6.6V. The level is set to be just above the voltage where the inverting buffer ICs start to work normally, i.e. their minimum supply voltage. Hence, the monitoring circuit compares the voltage to the predetermined minimum voltage for operation, which is set as a threshold voltage, and if the measured voltage becomes less than the threshold voltage the monitor circuit has determined that the lower inverter IGBTs 1 are to be turned off.

FIG. 9 shows the circuit diagram of the monitor circuit 500. The circuit is duplicated and used to monitor the boost voltage (+6.6V) power supply of each STO channel. The precision voltage regulator, U502, is biased by resistors R531 and R505 to activate when the boost rail voltage is above 5.1V. When this voltage is exceeded, transistor Q520 is turned hard on. Thus when the boost voltage exceeds 5.1 V the collector voltage of Q520 is almost at the same voltage as the boost voltage rail. Diodes D501 and D502 and resistor R502 form a circuit that outputs 3.3V as the signal "boost rail healthy" 502 when Q520 is ON and 0V when Q520 is OFF. The signal "boost rail healthy" 502 is sent to the microprocessor 3 which can then monitor the state of the boost rail and respond accordingly. The second output, "Remove clamp" 501 is fed to the pulse clamp circuit, as discussed below.

When the monitoring circuit detects that the boosted voltage level is dropping to a level that will prevent the buffer from functioning, a pulse clamping circuit is used to force each of the outputs of the buffers to a state which will turn the lower inverter IGBTs 1 off. This is a second tier of control provided in the hardware to back up the normal control provided by the microprocessor. The pulse clamping circuit is activated after a time delay when the boosted voltage is detected to be low, i.e. below a certain threshold, by the monitoring circuit. The time delay is used to give the microprocessor 3 enough time to react and stop the inverter in a controlled fashion. If the microprocessor 3 does not respond for any reason, the pulse clamp will stop the lower inverter IGBTs switching and prevent any risk of hardware failure that could occur as a result of upper and lower inverter IGBTs being turned on simultaneously when the buffers of the STO behave unpredictably with a power supply (boost rail voltage) in a region between zero and the minimum voltage for correct operation. Thus the time delay is used to invoke hardware pulse clamp control to stop the inverter. The time delay is selected to be long enough to allow the processor to respond to a feedback signal from the monitoring circuit and turn off the transistors 1, 2. The time delay is short enough to clamp the transistor 2 gating pulses to OFF before the unpredictable behaviour of the inverting buffer ICs occurs, when their supply has decayed and entered the region of unknown behaviour.

Figure 10:
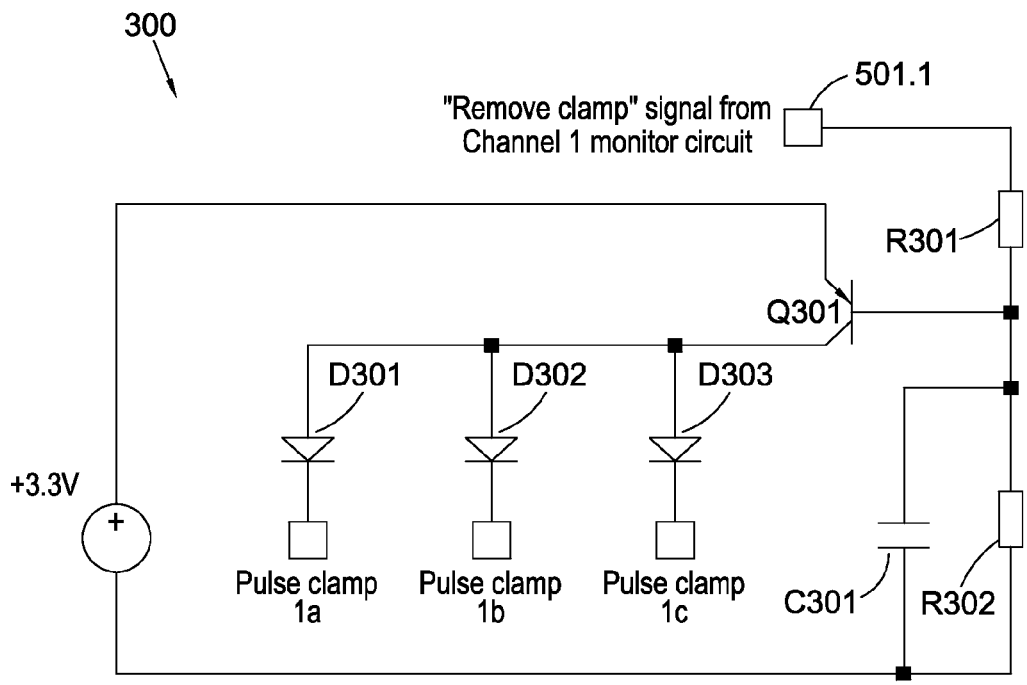
FIG. 10 shows the circuit diagram of a pulse clamping circuit for STO channel 1.

FIG. 10 shows the circuit diagram of the pulse clamping circuit 300 for STO channel 1. The signal "Remove clamp" 501 is generated by the monitor circuit of FIG. 9. If this signal is switched off (indicating that the channel 1 6.6V rail is below the minimum level for reliable operation of the buffers) transistor Q301 will turn on after a time delay which is set by the values of capacitor C301 and resistor R301. When transistor Q301 turns on it applies the +3.3V power supply to the anodes of the three diodes D301, D302 and D303. The cathodes of the three diodes D301, D302 and D303 are connected to the point labelled "Pulse clamp 1" s300 in FIG. 8. The effect of transistor Q301 turning on is to turn on the npn transistor of the level shifter 45 which in turn turns off the lower inverter transistor 2. The diodes D301, D302 and D303 are required to prevent the gate signals of each level shifter being connected to each other when the inverter is running normally. Note that FIG. 8 is repeated three times in the circuit of a three phase inverter. Hence the use of three diodes in the pulse clamp circuit of FIG. 10.

Figure 11:
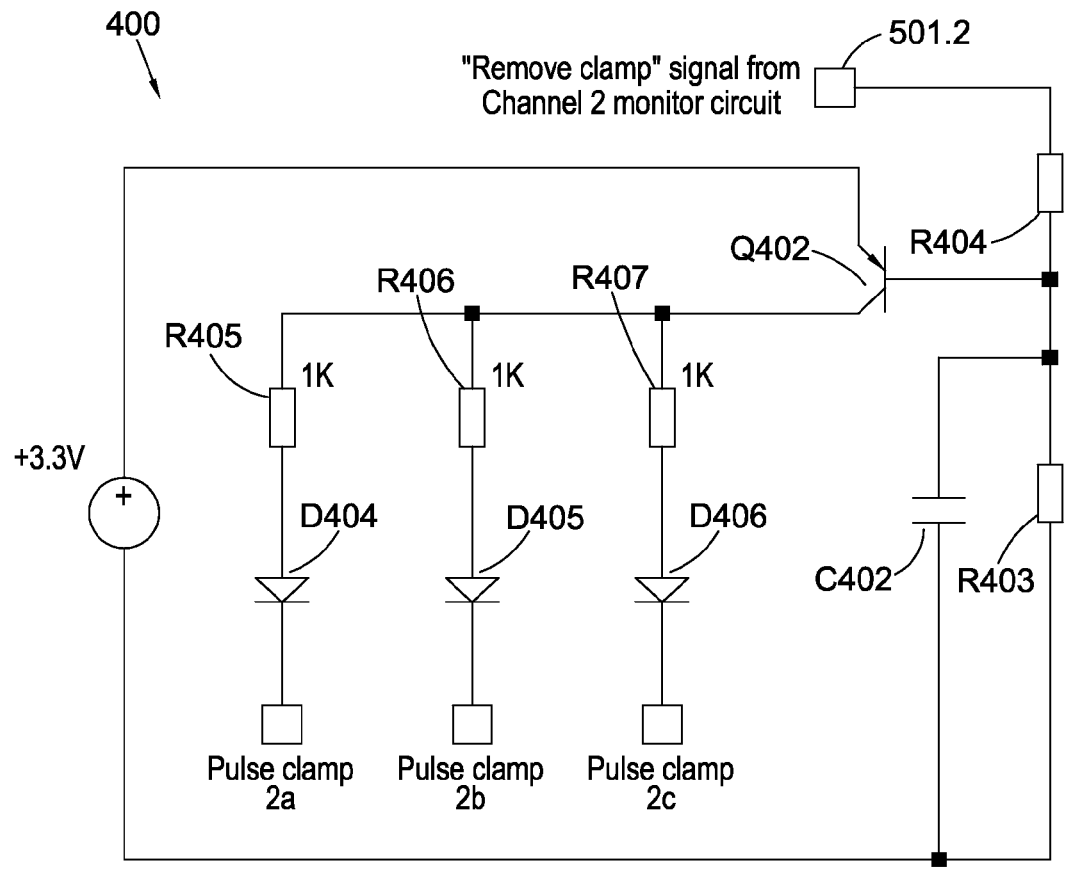
FIG. 11 shows the circuit diagram of a pulse clamping circuit for STO channel 2.

FIG. 11 shows the circuit diagram of the pulse clamping circuit 400 for STO channel 2. The signal "Remove clamp" 501 is generated by the monitor circuit of FIG. 9. If this signal is switched off (indicating that the channel 2 6.6V rail is below the minimum level for reliable operation of the buffers) transistor Q402 will turn on after a time delay which is set by the values of capacitor C402 and resistor R403. When transistor Q402 turns on it applies the +3.3V power supply to the anodes of the three diodes D404, D405 and D406 via series resistors R405, R406 and R407. The cathodes of the three diodes D404, D405 and D406 are connected to the point labelled ""Pulse clamp 2" in FIG. 8. The effect of transistor Q402 turning on is to turn on the npn transistor of the level shifter 46 which in turn turns off the lower inverter transistor 2. The diodes D404, D405 and D406 are required to prevent the gate signals of each level shifter being connected to each other when the inverter is running normally. The resistors R405, R406 and R407 are required to ensure sharing of current to drive the bases of the npn transistors in the three buffers 46 of the three phases. Note that FIG. 8 is repeated three times in the circuit of a three phase inverter, hence the use of three diodes in the pulse clamp circuit of FIG. 11.

It is worth noting the difference between features provided for safety and those provided for reliability. The strategy adopted for the failure mode analysis is to look at the effect of component failures upon the safety function, i.e. it does not take account of other functional effects. For example, IGBT gate pulse clamping circuits are used to overcome some particular behaviour which would otherwise result in incorrect operation of the drive. The IGBT gate pulse clamping circuits are not required to achieve the safety integrity of Safe Torque Off. Safe Torque Off will not be compromised (i.e. the motor will not produce torque), even if all the additional functionality that has been included to give correct operation of the drive (i.e. the monitor and pulse clamp circuits) fails in a mode that results in it becoming completely ineffective.

The STO 4 may be contained on a separate circuit board enclosed in a separate partition of the drive for further improved safety.

The invention claimed is:

1. Apparatus for preventing output of an input signal, comprising:
   a signal control unit comprising:
   a signal buffering unit having an input and an output, the signal buffering unit arranged to receive an input signal and pass the input signal to the output when the signal buffering unit is powered, wherein a negative power supply terminal of the signal buffering unit is arranged to be supplied by a first power source having a voltage; and
   a boost circuit arranged to boost the voltage of the first power source to a boosted voltage higher than the voltage of the first power source and supply either the voltage of the first power source or the boosted voltage to a positive power supply terminal of the signal buffering unit, wherein
   the signal buffering unit is powered when the boosted voltage is supplied to the positive power supply terminal of the signal buffering unit and the signal buffering unit is not powered when voltage of the first power supply terminal is supplied to the positive power supply terminal of the signal buffering unit.

2. The apparatus according to claim 1, wherein the boost circuit is driven by a second power source and the boost circuit is arranged to provide the voltage of the first power supply to the positive power supply terminal of the signal buffering unit when the second power source is turned off and output the boosted voltage to the positive power supply terminal of the signal buffering unit when the second power source is turned on.

3. The apparatus according to claim 2, wherein the boost circuit is a step-up converter.

4. The apparatus according to claim 3, wherein the boost circuit is a step-up converter having a switching element, the switching element being switched by an oscillator circuit driven by the second power source.

5. The apparatus according to claim 4, wherein the oscillator circuit includes a voltage threshold circuit arranged to prevent switching signals for switching the switching element being output in the event that the oscillator is being driven by a voltage less than a threshold voltage associated with the second voltage source.

6. The apparatus according to claim 2, wherein the boost circuit is prevented from being driven by the second voltage source when the second voltage source is disconnected from the boost circuit.

7. The apparatus according to claim 1, wherein the signal buffering unit comprises two buffers each formed in separate ICs, the two buffers arranged in series.

8. The apparatus according to claim 1, further comprising a voltage monitoring circuit arranged to detect if a voltage supplied to the positive power supply terminal of the signal buffering unit by the boost circuit is less than a threshold voltage associated with the positive power supply terminal, wherein the threshold voltage associated with the positive power supply terminal is between the boosted voltage and the voltage of the first power source.

9. The apparatus according to claim 8, wherein the threshold voltage associated with the positive power supply terminal is greater than or equal to the minimum operating voltage of the signal buffering unit.

10. The apparatus according claim 8, wherein the signal buffering unit further comprises a switching arrangement arranged to prevent an input signal passing from the input to the output of the signal buffering unit, the switching arrangement of the signal buffering unit being switchable responsive to the voltage monitoring circuit detecting that the voltage supplied to the positive power supply terminal of the signal buffering unit is less than the threshold voltage.

11. The apparatus according to claim 1, further comprising a further signal control unit provided according to a signal control unit, the further signal control unit provided in series with the signal control unit.

12. The apparatus according to claim 1, wherein the input signal arranged to be received by the signal buffering unit is a control signal for controlling the switching of a switching arrangement for driving a motor.

13. Apparatus for providing output voltages for driving a motor, the apparatus comprising:

a first switching arrangement arranged for supplying a first output voltage responsive to a first control signal, the first switching arrangement powered by a first power supply;

a second switching arrangement arranged for supplying a second output voltage responsive to a second control signal, wherein the first and second control signals are arranged to respectively switch the first and second switching arrangements on at different instants in time;

a power storage arrangement arranged to be charged by the first power supply when the first switching arrangement is supplying the first output voltage and arranged to power the second switching arrangement when the second switching arrangement is supplying the second output voltage; and a control unit arranged to prevent the supply of the first and second output voltages by preventing the supply of control signals to the first switching arrangement.

14. The apparatus according to claim 13, wherein the first and second switching arrangements each comprise a switching element and a driving unit, each driving unit arranged to apply a signal to the respective switching element of the switching arrangement responsive to receipt of the respective control signal.

15. The apparatus according to claim 13, wherein the power storage arrangement is a bootstrap circuit.

16. The apparatus according to claim 13, wherein the first and second output voltages are for driving a motor.

17. The apparatus according to claim 16, wherein the apparatus is arranged to provide output voltages corresponding to one phase of a three phase motor drive system.

18. A motor drive system comprising:
a three-phase motor; and
a drive unit comprising driving arrangements for each phase, wherein the driving arrangement for each phase is provided according to the apparatus of claim 13.

19. The motor drive system according to claim 18, further comprising a controller for producing control signals including the first and second control signals.

* * * * *